United States Patent [19]
Hinkley

[11] 3,718,482
[45] Feb. 27, 1973

[54] A FOOD COMPOSITION WITH ISOASCORBIC ACID-PHOSPHATE AS AN ANTIOXIDANT
[75] Inventor: David F. Hinkley, Plainfield, N.J.
[73] Assignee: Merck & Co., Inc., Rahway, N.J.
[22] Filed: May 6, 1971
[21] Appl. No.: 140,998

Related U.S. Application Data

[63] Continuation-in-part of Ser. No. 816,771, April 16, 1969, abandoned.

[52] U.S. Cl. ..................99/150, 99/154, 99/158, 99/157, 99/163, 260/343.7, 252/400
[51] Int. Cl. ..........................A23l 3/00, C07d 5/12
[58] Field of Search........99/150, 163, 154, 158, 165, 99/182, 157; 252/400; 260/343.7

[56] References Cited

OTHER PUBLICATIONS

Sintesi dell'estere 3–fosforiso delfacido I–ascorbic. Cutolo et al., Gazetta Chimia Italiana V91, 8, 1961 p. 964–972

Primary Examiner—Norman Yudkoff
Assistant Examiner—Hiram H. Bernstein
Attorney—John J. Maitner, John Frederick Gerkens and J. Jerome Behan

[57] ABSTRACT

Novel isoascorbic acid phosphates and salts thereof, useful as antioxidants, are prepared by phosphorylating 5,6-O-loweralkylidene isoascorbic acid. Also, antioxidant compositions and methods of inhibiting oxidation in preserved foods and beverages are included.

9 Claims, No Drawings

FOOD COMPOSITION WITH ISOASCORBIC ACID-PHOSPHATE AS AN ANTIOXIDANT

CROSS REFERENCE TO RELATED APPLICATIONS

This application is a continuation-in-part of U. S. Ser. No. 816,771, filed Apr. 16, 1969 now abandoned.

SUMMARY OF THE INVENTION

An object of the present invention is provision of novel antioxidants which are adaptable to use in food and beverage processing.

More particularly, an object of the present invention is provision of a stabilized form of isoascorbic acid having controlled and prolonged antioxidative properties and which is not subject to the undesirable oxidative influences observed with heretofore commonly used known antioxidants such as ascorbic or isoascorbic acids.

Another object of the present invention is provision of a method for preparing the novel antioxidants of the present invention.

A further object of the present invention is provision of a method of inhibiting oxidation in processed food and beverages.

Still another object of the present invention is provision of novel antioxidant compositions which are useful in food and beverage processing to stabilize flavor components, maintain color, to prevent the formation of off odors, and increase the shelf life of the processed product.

Other objects, features and advantages of the prevent invention will become apparent to those skilled in the art from the following detailed disclosure thereof.

BACKGROUND OF THE INVENTION

The use of ascorbic and isoascorbic acids and salts thereof an antioxidants in the processing of foods and beverages is widely known. As antioxidants these agents can effectively retard the oxidative deterioration with the resultant occurrence of off flavors, off odors, and discoloration, in a wide variety of food materials processed and packed in the conventional ways. Notwithstanding the efficacious antioxidative characteristics that have been observed with these agents, experience has also shown that isoascorbic and ascorbic acids possess inherent properties that detract from their usefulness as antioxidants. For example, although in the dry form both ascorbic and isoascorbic acid and salts thereof are stable for long periods when stored under cool, dry conditions, discoloration may occur during prolonged storage and this decomposition is accelerated by the presence of moisture or elevated temperatures and exposure to air. Likewise, solutions of these acids will rapidly undergo oxidation if exposed to air, alkaline conditions or high temperatures, even for relatively short periods. Furthermore, certain metals such as copper and iron greatly accelerate the destruction of ascorbic acid, either in dry form or solution. Thus, in order to effectively use isoascorbic or ascorbic acid as antioxidants in the preservation of food and beverages, it is often necessary to use an excess over the amount actually needed or effect addition at a late stage in the process, such as immediately prior to canning or packing the food to be processed.

In certain cases, even the use of excesses or the late addition of the antioxidant may still be inadequate to afford extended shelf life to some products due to what may be termed "enzymatic", "residual", or "autoxidative" changes occurring in the food or beverage after processing and packaging.

The instability of both isoascorbic and ascorbic acids is known to be due to the high sensitivity of the enolic hydroxyl groups of the lactone ring to oxidative influences. In order to prevent this oxidation, one or both of the enolic hydroxyl groups may be blocked; for example, by formation of an ester or ether thereof. Unfortunately, the esterification or etherification of these hydroxyl groups often renders isoascorbic or ascorbic acid unsatisfactory or useless as an antioxidant for different reasons; namely, the resistance to in vitro or in vivo cleavage of the ether or ester group. Thus, it is desirable to protect the enolic hydroxyls on the lactone ring by means of a group which is stable to aerial or other rapid oxidation influences, yet is slowly hydrolyzed under in vitro or in vivo conditions by enzymatic or other controlled mechanisms. It has been found that the phosphate esters of isoascorbic acid meets the desired criterion of stability and availability.

DESCRIPTION OF THE PREFERRED EMBODIMENT

The novel compounds of the present invention are phosphate esters of isoascorbic acid and salts thereof. More particularly, the novel compounds of the present invention are derivatives of isoascorbic acid formed by the phosphorylation of one or both of the hydroxyl groups contained on the 2 and 3 position of the isoascorbic molecule. Thus, the novel compounds of the present invention are namely isoascorbic acid-2-phosphate, isoascorbic acid-3-phosphate, isoascorbic acid-2,3-diphosphate, and isoascorbic acid-2,3-cyclic phosphate, and the mono-, di-, or tri- alkali and alkaline earth metal salts thereof.

The novel compounds of the present invention function as antioxidants via the slow liberation of isoascorbic acid by medium hydrolysis or enzymatic cleavage. By virtue of this ability to slowly hydrolyze to isoascorbic acid, the novel compounds of the present invention offer many advantages over the free ascorbic and isoascorbic acids when used as antioxidants in food and beverage processing since, for the most part, they are stable for longer periods towards oxidative influences that ordinarily lead to the premature decomposition of isoascorbic acid. For example, the 3-phosphate ester of isoascorbic acid is stable in aqueous solutions for prolonged periods even at elevated temperatures and in the presence of air, and metals do not appear to have a deleterious effect on this form of isoascorbic acid. Similarly, the 2-phosphate ester, although not quite as stable as the 3-ester, is significantly more stable than isoascorbic ester under the same conditions. The 2,3-diphosphate ester and the 2,3-cyclic esters, however, appear to be quite labile, offering only a slight resistance to cleavage of the ester moiety.

The advantages which may be realized by the use of the compounds of the present invention as antioxidants in the preservation of food and beverages are quite significant, for it is apparent that they can be made up in solution for longer periods of time prior to use, are more economical since excesses are not necessary, effectively act over a more prolonged period of time and thus extend shelf life, and can be added to any stage of the food processing procedure.

The novel compounds and compositions of the present invention can be utilized to preserve or stabilize a wide variety of food and beverages and, in fact, can be used in nearly every instance where ascorbic or isoascorbic acid is presently used without necessitating a change of equipment or technique in the preparation of the food or beverage to be preserved. Thus, the novel compounds can be used to preserve the fresh color and flavor of frozen or canned fruits such as peaches, apricots, apple slices, bananas, cherries, plums, pears, grapefruit, and mixed fruits.

The novel compounds and compositions of the present invention can also be used to effectively retard and overcome the problems of rancidity due to oxidation occurring in frozen fish, particularly the fatty type, as well as other seafood such as frozen clams which tend to darken due to oxidative and enzymatic reactions. The novel compounds of the present invention may also be used to process mushrooms so that their natural light color may be preserved even after the container has been opened and stored at room temperature or refrigerator temperature. The phosphate esters of the present invention may also be utilized in the curing of a variety of meats such as liver sausage, bacon, ham, and frankfurters. In this capacity the novel antioxidants are particularly effective in that with minimum amounts there is afforded by the enzymatic cleavage occurring when in contact with the meat, a prolonged residual concentration of isoascorbic acid thereby assuring prolonged reducing action on nitrite and heme pigments of meat.

The novel compounds and compositions of the present invention are particularly useful in still and carbonated and fermented beverages such as white wines, beer and ale. In still and carbonated beverages the phosphate esters of the present invention by virtue of their slow hydrolysis to isoascorbic acid can materially reduce the effects of iron pickup occurring in canned beverages due to corrosion. These undesirable oxidative influences are thereby effectively neutralized, thus protecting citrus oil terpenes, for example, which are extremely vulnerable to oxidation, particularly in the presence of sunlight. Likewise, following the fermentation or brewing phase, beer and ale are unavoidably exposed to varying amounts of air. As a result, the final packaged product (whether in cans, bottles or kegs) contains oxygen in both dissolved form and as gas in the container headspace. During the period between packaging and consumption, the dissolved and headspace oxygen react with beer components causing gradual changes in flavor, clarity, and in some instances, aroma and color. The extent of these changes will depend primarily upon the length of storage prior to consumption, temperature during storage, and exposure of the product to light. The well-known "-pasteurized taste", sometimes encountered when pasteurizing times or temperatures are excessive, is an example of undesirable flavor arising through the combined effects of oxygen and temperature.

The addition of the compounds and compositions of the present invention subsequent to the brewing phase will effectively protect beer quality by minimizing oxidative changes in the beer.

As indicated above, the compounds of the present invention may be used to form antioxidant compositions. As such, the composition may contain one or more of the novel esters of isoascorbic acid. Thus, an effective composition may contain only the 3-phosphate ester of isoascorbic acid or the alkali metal or alkaline earth metal salts thereof and preferably the trisodium salt salt thereof, or the composition may contain a mixture of the 2- and 3-phosphate esters, the alkali metal or alkaline earth metal salts thereof and particularly the trisodium salts thereof. In addition to the mixtures of 2- and 3-phosphate esters, the compositions of the present invention may additionally contain either or both, the 2,3-diphosphate ester of isoascorbic acid and the 2,3-cyclic phosphate ester or the alkali metal salts thereof, preferably the sodium salts thereof. An especially useful composition is obtained by combining one or more of the novel esters, alkali metal, or alkaline earth metal salts thereof with ascorbic acid, but preferably isoascorbic acid and the sodium salts thereof. The advantages which can be realized from the latter-mentioned composition are immediately apparent for not only does such a composition contain as an ingredient an agent which is capable of prolonged antioxidant activity by the slow hydrolysis to isoascorbic acid, but also contains an ingredient, namely ascorbic or isoascorbic acid, which is immediately available and will thus effectively consume oxygen contained in the headspace of the container in which the food or beverage is packed.

The relative amounts of the various phosphate esters of isoascorbic acid and the free isoascorbic contained in the novel compositions of the present invention may vary widely. For example, a suitable antioxidant composition may contain anywhere from 5 to 95 percent of the 2- and/or 3-phosphate ester of isoascorbic acid, 10–70 percent of the 2,3-diphosphate ester, 5–60 percent of the 2,3-cyclic phosphate ester of isoascorbic acid, and 5–95 percent of isoascorbic acid. A preferred composition of the present invention is one that contains 3-phosphate esters of isoascorbic acid combined with isoascorbic acid or the sodium salts thereof, each ingredient comprising either a major or minor proportion of the composition.

In utilizing the novel compounds and compositions of the present invention, an antioxidative amount of one of the novel compounds or compositions of the present invention is added to the food or beverage prior to packaging. By the term "prior to packaging" is meant at any step of the processing procedure including just prior to sealing in the unit container. By the term "antioxidative amount" is meant the minimum amount of antioxidant needed to consume the dissolved oxygen, the headspace oxygen, or any residual oxidative elements which might form during the processing or upon storage of the processed food or beverage. Thus, the exact amount and the relative proportions of the active ingredients in the compositions utilized will vary depending on the type of food to be preserved, the size and headspace in the packing container, the processing procedure utilized, and the point in the processing step at which the antioxidant composition is added.

For example, if the oxidative influences are greatest during processing, i.e., temperature and other conditions, then the composition used will predominantly contain the more stable antioxidants such as the 2- and/or 3-phosphate esters of isoascorbic acid and relatively smaller proportions of the less stable esters and/or the free acid itself. On the other hand, if it is desired to have a prolonged residual antioxidant effect and where there is also present a need for immediate consumption of available oxygen, it is desirable to have the free acid in excess with minor amounts of the more stable 2- and 3-ester.

The novel compounds of the present invention may be prepared by contacting a 5,6-O-loweralkylidene isoascorbic acid dissolved in an anhydrous organic solvent, such as acetone, with a phosphorylating agent, suitably phosphorous oxychloride, in the presence of a tertiary amine such as pyridine. The phosphorylation is effected at room temperature, but preferably at a lower temperature of from about -5° to about 15°C., and continued until a sample when titrated with iodine using a starch indicator becomes negative for free isoascorbic acid. The reaction mixture is then neutralized with a base such as an alkali or alkaline metal hydroxide or bicarbonate such as sodium bicarbonate, aged, and filtered, and the filtrate containing a mixture of the 5,6-loweralkylidene isoascorbic acid-2- and 3-phosphates, and minor amounts of -2,3-diphosphate and -2,3-cyclic phosphate esters of 5,6-loweralkylidene isoascorbic acid. The mixture of esters can be isolated from the reaction mixture by recrystallization from a methanol solution and the 5,6-O-isopropylidene protecting group hydrolyzed with, for example, 0.1 HCl. The respective phosphate esters of isoascorbic acid may be separated from the reaction mixture by column chromatography using as a solvent, for example, isopropanol:water:acetic acid:concentrated ammonium hydroxide (65:30:30:30), the esters fractionating in the following order, the 2,3-cyclic ester of isoascorbic acid, the 2-phosphate ester of isoascorbic acid, the 3-phosphate ester of isoascorbic acid and finally the 2,3-diphosphate ester of isoascorbic acid. The respective esters can be obtained in pure form by further purification on ion exchange resins.

Alternatively, the 3-phosphate ester of isoascorbic acid may be obtained by treating the mixture of esters with concentrated hydrochloric acid. This treatment serves to selectively hydrolyze the 2-phosphate, the 2,3-diphosphate and 2,3-cyclic phosphate ester moieties such that there remains in solution the 3-phosphate ester of isoascorbic acid and free isoascorbic acid. The isolation of the desired 3-phosphate ester may be accomplished by methods known in the art.

The alkali and alkaline earth metal salts of the phosphate esters of isoascorbic acid may be prepared by treating the respective ester with the desired amount of alkali metal or alkaline earth metal base such as sodium hydroxide, potassium hydroxide, lithium hydroxide, calcium hydroxide, and magnesium hydroxide. Thus, the trisodium salt of isoascorbic acid-2- or 3-phosphate can be obtained by adding sufficient base until the pH is greater than 9. The mono- and di- metal salts may be prepared by the partial acidification of the tri- metal phosphate ester of isoascorbic acid; for example, the trialkali or trialkaline earth metal salts of the 2- or 3-phosphate ester of isoascorbic acid, suitably the trisodium, tripotassium or trimagnesium salt is dissolved in water and one or two equivalents of acid added per ion mol of phosphate ester moiety. In a similar manner, the tetra salt of the 2,3-diphosphate ester and the monosalt of the 2,3-cyclic ester of isoascorbic acid may be prepared, that is, by adding sufficient of the desired base until a pH of 10 is obtained. A mixture containing the tri- alkali metal salt of the 2- and 3-phosphate ester, the tetra alkali metal salt of the 2,3-diphosphate ester and the mono- alkali metal salt of the 2,3-cyclic ester of isoascorbic acid is obtained by treating the mixture of esters with one of the aforementioned alkali metal hydroxides, preferably 50 percent sodium hydroxide, until the pH is greater than 9.

The 5,6-O-loweralkylidene derivative of isoascorbic acid may be prepared by methods well known in the art. For example, the 5,6-O-loweralkylidene derivatives of isoascorbic acid may be prepared by suspending isoascorbic acid in a suitable ketone or aldehyde solvent in the presence of an acid catalyst such as p-toluene-sulfonic acid. Thus, 5,6-O-isopropylidene isoascorbic acid may be prepared using acetone as the solvent and 5,6-O-formylidene isoascorbic acid may be prepared using formaldehyde. Other loweralkylidene derivatives of isoascorbic acid may be prepared using other appropriate loweralkylketones or aldehydes.

EXAMPLE 1

Stabilization of Beer

The beer is fermented in the usual manner. At the end of the fermentation period there is added ½ lb. of a mixture containing 10 percent sodium isoascorbate and 90 percent of trisodium isoascorbic acid-3-phosphate per 100 barrels of beer. Prior to final filtration there is added ¾ lb. of a mixture containing 90 percent sodium isoascorbate and 10 percent trisodium isoascorbic acid-3-phosphate per 100 barrels of beer. The beer is bottled or canned immediately in the usual manner. In accordance with the above procedure, the following salts may be employed in place of trisodium isoascorbic acid-3-phosphate: mono-magnesium salt of isoascorbic acid-3-phosphate and mono-calcium salt of isoascorbic acid-3-phosphate.

Stabilization of Ale

The ale is fermented in the usual manner. At the end of the fermentation period there is added 1 ½ lb. of a mixture containing 60 percent of trisodium isoascorbic acid-3-phosphate, 10 percent of trisodium isoascorbic acid-2-phosphate, and 30 percent sodium isoascorbate per 100 barrels of ale. The ale is then pasteurized, filtered, and bottled or canned immediately.

Preserved Heat Processed Mushrooms

Mushrooms are prepared in the usual manner. Prior to heat processing there is added to the menstruum 250 mg. of the trisodium salt of isoascorbic acid-3-phosphate per lb. of mushrooms (drained weight). Immediately prior to packing there is added an additional 100 mg. per lb. of mushrooms of a mixture containing 40 percent trisodium isoascorbic acid-2-phosphate and 60 percent sodium isoascorbate.

Preservation of Frozen Clams

Clams (2.5 gal. shucked) are washed and minced, then rinsed and agitated for 5 minutes in an aqueous solution containing 5 percent sodium isoascorbate and 30 percent trisodium isoascorbate-3-phosphate. The clams are then drained and cold water added during packaging to obtain the desired consistency. In accordance with the above procedure, the following salts may be employed in place of trisodium isoascorbic acid-3-phosphate: monomagnesium salt of isoascorbic acid-3-phosphate and monocalcium salt of isoascorbic acid-3-phosphate.

Preparation of Cured Liver Sausage

A mixture containing 215 lbs. of pork livers, 300 lbs. of veal, pork jowls and bacon pieces, and 21 lbs. of bologna cure (containing 0.33 percent sodium nitrite) are chopped together in a chopper. To the subdivided mixture is added about 65 lbs. of water containing 3 oz. of trisodium isoascorbic acid-3-phosphate. The mixture is then fed through the chopper again for 1 minute to thoroughly mix the solution into the emulsion. The mixture is then stuffed into sewed hog bungs and the bungs placed in a water bath cooker (190°F.) and cooked to an internal temperature of 162°F. Upon reaching 162°F., the bungs are removed from the cooker and put into a cooler for chilling. In accordance with the above procedure, the following salts may be employed in place of trisodium isoascorbic acid-3-phosphate: mono-magnesium salt of isoascorbic acid-3-phosphate and mono-calcium salt of isoascorbic acid-3-phosphate.

Peaches or Apricots Packed with Sugar Syrup

The fruit is prepared in the usual way by either steam or lye-peeling, caution being observed in the lye-peeling process to neutralize the lye adhering to the fruit with a citric acid, washed to prevent destruction of the natural Vitamin C content of the fruit, and packed in the desired unit package.

800 Grams of a 50 percent mixture of the trisodium salt of isoascorbic acid-3-phosphate and isoascorbic acid is dissolved in a gallon of water and then added to 99 gallons of cool 60–65 percent syrup. The syrup is then added to the fruit so that the fruit is completely covered and as little as possible headspace remains. In accordance with the above procedure, the following salts may be employed in place of trisodium isoascorbic acid-3-phosphate: mono-magnesium salt of isoascorbic acid-3-phosphate and mono-calcium salt of isoascorbic acid-3-phosphate.

EXAMPLE 2

Preparation of the Phosphate Esters of Isoascorbic Acid

Step 1

Phosphorylation of 5,6-O-isopropylidene isoascorbic acid to form the phosphate esters thereof 195 G. (0.9030 moles) of 5,6-isopropylidene isoascorbic acid is dissolved in 6,700 ml. of dry acetone at 40°C. under nitrogen and the solution is subsequently cooled to −5°. To this solution is then added, via a dropping funnel over a 45 minute period, a freshly prepared solution containing 97.5 ml. (1.005 moles) of phosphorous oxychloride, and 273 ml. (3.46 moles) of pyridine which has been cooled to 10–15°. The batch is then aged for another 45 minutes during which time the temperature is maintained at −5° to 2°C. To the aged batch is then added 341 g. (4.06 moles) of sodium bicarbonate followed by a careful addition of 560 ml. of water. The resulting slurry is then aged for one hour, filtered, and the resulting salt cake washed twice with 600 ml. of acetone. The combined filtrates contain a mixture primarily of the 2- and 3-enol phosphate esters of 5,6-O-isopropylidene isoascorbic acid and the 2,3-diphosphate and 2,3-cyclic phosphate esters of 5,6-O-isopropylidene isoascorbic acid in lesser amounts. The combined filtrates are then concentrated on a bath under vacuum to a heavy oily syrup containing a mixture of the 2- and 3-enol phosphate esters of 5,6-O-isopropylidene isoascorbic acid, and the 2,3-diphosphate and 2,3-cyclic phosphate esters of isoascorbic acid.

Step 2

Cleavage of 5,6-O-isopropylidene protecting group

The mixture containing the phosphate esters of 5,6-isopropylidene isoascorbic acid is dissolved rapidly in 1200 ml. of 0.1N hydrochloric acid. The batch is then aged at room temperature for one-half hour after which it is diluted with 4160 ml. of methanol (pre-cooled in an acetone wet ice bath) and the pH slowly adjusted to 5.5 with about 825 ml. of 50 percent aqueous sodium hydroxide, while the temperature is maintained at about 10°–15°C. The mixture is then aged for 1 hour, filtered, and the precipitate containing sodium chloride is washed with 700 ml. of methanol. The filtrate and washings contain the crude phosphate esters of isoascorbic acid, traces of free isoascorbic acid and inorganic phosphate salts.

Step 3

Isolation of crude isoascorbic acid phosphates

The pH of the filtrate obtained in the step above is slowly adjusted from 5.5 to 6.5–7.0 with 50 percent sodium hydroxide solution, and the pH is slowly raised to 10.0 using 50 percent sodium hydroxide. The resulting slurry is then aged for a period of 12 to 20 hours at room temperature, after which it is filtered (filtrate contains traces of isoascorbic acid in the form of its sodium salt) and the solid obtained thereby washed twice with 500 ml. of methanol followed by 500 ml. of ether and sucked dry on the funnel under nitrogen, the precipitate obtained contains a mixture of crude 2- and 3-enol phosphate ester of isoascorbic acid trisodium salt, 2,3-diphosphate isoascorbic acid tetrasodium salt and 2,3-cyclic phosphate isoascorbic acid monosodium salt.

EXAMPLE 3

Separation of phosphate esters of isoascorbic acid

The mixture obtained in Step 3 of the example above is placed on a 1 ¼ inch × 20 inch silica gel column prepared in the manner described by B. Love and M. Goodman, (*Chem. and Ind.*, Dec. 2, 1967, Dry Column Chromatography) and eluted with a solvent comprising isopropanol:water:acetic acid:ammonium hydroxide (65:30:30:30). The eluate is collected in 20 ml. fractions whose composition is evaluated via thin layer chromatography on silica gel using a similar solvent system. The fractions containing each isomer are combined and evaporated to small volume and diluted with 50 percent sodium hydroxide to pH 10. The solutions are then mixed with 5 volumes of methanol and allowed to stand overnight. The resulting precipitates of sodium salts are filtered and washed with a little aqueous methanol to give, after drying, the several isomeric phosphates, respectively.

EXAMPLE 4

Preparation of trisodium isoascorbic acid-3-phosphate

When Example 2 is repeated, using in Step 2 concentrated hydrochloric acid in place of 0.1N hydrochloric acid, there is afforded in Step 3, trisodium isoascorbic acid-3-phosphate.

EXAMPLE 5

Preparation of various mono- and di- salts of isoascorbic acid-3-phosphate 35.8 G. (0.1 mol) of trisodium isoascorbic acid-3-phosphate is suspended in 40 ml. of acetone under nitrogen and there is added thereto 50 ml. of 2N hydrochloric acid over 2 hours at 15°C. The mixture is stirred for an hour and 200 ml. of methanol added thereto. The mixture is stirred an additional hour at 40°C., filtered, and the filter cake washed with methanol and the product dried at 40°C. in vacuo. There is thus produced disodium isoascorbic acid-3-phosphate.

In accordance with the above procedure, but starting with the corresponding tri-potassium salt, di-(isoascorbic acid-3-phosphate)tri-lithium salt, and di-(isoascorbic acid-3-phosphate)tri-calcium salt, and di-(isoascorbic acid-3-phosphate)tri-magnesium salt, there is obtained the corresponding di-potassium, mono-lithium, monocalcium and mono-magnesium salt of isoascorbic acid-3-phosphate.

In accordance with the above procedure, but using 100 ml. of 2N hydrochloric acid, there is obtained the corresponding isoascorbic acid-3-phosphate mono-sodium and mono-potassium salt of isoascorbic acid-3-phosphate di-(isoascorbic acid-3-phosphate)monolithium, mono-calcium and mono-magnesium salt.

What is claimed is:

1. A method for inhibiting oxidation in processed foods and beverages which comprises adding to said food or beverage prior to packaging an antioxidative amount of an antioxidant selected from at least one member of the group consisting of the isoascorbic acid-3-phosphate, isoascorbic acid-2-phosphate, isoascorbic acid-2,3-diphosphate and isoascorbic acid-2,3-cyclic phosphate, the alkali metal salts, and alkaline earth metal salts thereof.

2. The method of claim 1 wherein the alkali metal is sodium.

3. The method of claim 1 wherein the antioxidant is selected from the group consisting of isoascorbic acid-3-phosphate and isoascorbic acid-2-phosphate or the trisodium salts thereof.

4. The method of claim 1 wherein the antioxidant is isoascorbic acid-3-phosphate or the trisodium salt thereof.

5. The method of claim 1 wherein the antioxidant is isoascorbic acid-2-phosphate or the trisodium salt.

6. The method of claim 1 wherein the alkaline earth metal salt is magnesium.

7. A method for inhibiting oxidation in processed foods and beverages which comprises adding to said food or beverage prior to packaging an antioxidative amount of an antioxidant selected from the group consisting of ascorbic and isoascorbic acids or the sodium salts thereof and at least one member selected from the group consisting of isoascorbic acid-3-phosphate and isoascorbic acid-2-phosphate, alkali metal salts, and alkaline earth metal salts thereof.

8. The method of claim 7 wherein the antioxidant is isoascorbic acid or the sodium salt thereof and isoascorbic acid-3-phosphate or a sodium salt thereof.

9. The method of claim 7 wherein the antioxidant is isoascorbic acid or the sodium salt thereof and isoascorbic acid-2-phosphate or a sodium salt thereof.

* * * * *